(12) United States Patent
Hosaka et al.

(10) Patent No.: US 6,229,110 B1
(45) Date of Patent: May 8, 2001

(54) FLUSHING DEVICE FOR A WIRE-CUT ELECTRIC DISCARGE MACHINE

(75) Inventors: Akio Hosaka; Shinji Ashida, both of Fukui (JP)

(73) Assignee: Sodick Co., Ltd., Yokohama (JP)

( * ) Notice: Subject to any disclaimer, the term of this patent is extended or adjusted under 35 U.S.C. 154(b) by 0 days.

(21) Appl. No.: 09/280,664

(22) Filed: Mar. 29, 1999

(30) Foreign Application Priority Data

Mar. 31, 1998 (JP) .................................... 10-103493

(51) Int. Cl.⁷ ............................. B23H 1/00; B23H 7/02

(52) U.S. Cl. ..................... 219/69.12; 219/69.14

(58) Field of Search ............................ 219/69.12, 69.14

(56) References Cited

U.S. PATENT DOCUMENTS

| | | | |
|---|---|---|---|
| 4,575,603 | 3/1986 | Inoue et al. | 219/69.12 |
| 4,833,290 | * 5/1989 | Obara | 219/69.12 |
| 5,126,524 | * 6/1992 | Moro et al. | 219/69.12 |
| 5,128,505 | 7/1992 | Matter | 219/69.12 |

FOREIGN PATENT DOCUMENTS 1-109026 * 4/1989 (JP).

* cited by examiner

Primary Examiner—Geoffrey S. Evans
(74) Attorney, Agent, or Firm—McDermott, Will & Emery; Paul Devinsky

(57) ABSTRACT

A flushing device having therein a chamber into which dielectric fluid is supplied for injecting dielectric fluid into a machining gap formed between a workpiece being machined and a wire electrode in a wire-cut electric discharge machine, a nozzle movable between a first position and a second position that is nearer the workpiece than the first position, for directing the dielectric fluid in the chamber toward the machining gap; and a spring or other bias apparatus for holding the nozzle in the first position. The spring constant of the spring or bias apparatus being such that during a first cut, when dielectric fluid is supplied to the chamber at a higher pressure, the force from the fluid pressure is sufficient to overcome the force of the spring or other bias apparatus, and the nozzle is caused to move to the second position; and during a skim cut, when the dielectric fluid is supplied to the chamber at a lower pressure, the force from the fluid pressure is insufficient to overcome the force of the spring or other bias apparatus, and the nozzle remains at the first position.

12 Claims, 4 Drawing Sheets

FLUSHING DEVICE FOR A WIRE-CUT ELECTRIC DISCARGE MACHINE

FIELD OF THE INVENTION

The present invention relates to a wire-cut electric discharge machine in which a workpiece is machined by intermittently applying voltage pulses across a small gap formed between the workpiece and a traveling wire electrode, known as the "machining gap." More specifically, the present invention relates to a flushing device for a wire-cut electric discharge machine for introducing fresh dielectric fluid to the machining gap during machining.

BACKGROUND OF THE INVENTION

A pair of flushing devices for introducing machining fluid into the machining gap of a wire-cut electric discharge machine are typically placed on a generally vertical line: one above the workpiece, and one below it. The pair of the flushing devices have respective wire guides therein between which the wire electrode travels generally vertically. Fresh dielectric fluid is forced from nozzles of the upper and lower flushing devices so as to be injected into the machining gap, formed between the workpiece being machined and the traveling wire electrode. This flushing with fresh dielectric fluid cools the wire electrode and workpiece, and also flushes chips produced during machining out of the machining gap. If allowed to remain in the machining gap, chips of conductive material can cause undesirable secondary discharge, which degrades machining accuracy. In addition, flushing constantly replaces the used fluid in the machining gap with fresh dielectric, thus providing faster recovery of the insulating properties of the dielectric fluid, which increases the machining rate. The tips of the flushing device nozzles are usually placed as close as possible to the surface of the workpiece to enable more fluid to be efficiently supplied to the gap. When a first cut with a faster metal removal rate is made in a workpiece, a greater amount of electrical energy is normally supplied to the wire electrode. Under first cut conditions, flushing with a large amount of fluid under high pressure is especially important in order to prevent wire breakage. During a first cut, fluid supplied to the machining area is typically pressurized to about 15–20 kgf/cm$^2$, and the gap between the tips of the nozzles and the workpiece is maintained at approximately 0.05 mm. Following the first cut, one or more "skim cuts" are normally performed. During skim cuts, a smaller amount of electrical energy is supplied to the wire electrode in order to more precisely machine the workpiece to the desired finish dimensions. A skim cut reduces surface roughness in the kerf created during the first cut. A number of skim cuts may be performed, with the machining energy reduced incrementally from one cut to the next. The dielectric fluid pressure setting used for skim cuts is quite low compared to that used for a first cut (typically on the order of 0.5–1.0 kgf/cm$^2$). The reason for keeping the fluid pressure low is that greater machining precision is required during skim cuts, and maintaining the fluid pressure at a low value suppresses wire vibration, which improves accuracy. This reduction in fluid pressure is possible because, at the lower machining energy and stock removal rates used for skim cuts, the lower flow rate is sufficient to provide adequate cooling and chip removal. The flow rate and pressure of the dielectric fluid are controlled to keep them at the desired values by flow rate adjustment valves. When making skim cuts, in particular, it is important that the flow rate of the dielectric fluid being injected into the machining gap be accurately maintained at a low value. Expensive flow rate equipment is required to make accurate flow rate adjustment over the broad range of values required for both first cuts and skim cuts, and in actual practice, even with good equipment, it is very difficult to accurately control the flow rate at the low values required for skim cuts. Also, in most cases, as the wire electrode moves along the kerf, there can be wide variations in the rate at which the fluid comes at the wire from the front or back, depending on the path of the kerf that was created during the first cut. These undesirable variations, which are especially large when the wire is near a corner in the path of the kerf, can result in variances in the dimensions of the product being made from the workpiece. It can also cause the surface of the finished product to be left with machining marks in the form of lines running parallel to the direction of travel of the wire electrode between the wire guides. There is a need, then, for a simple flushing device that will enable skim cuts to be performed to precise dimensions.

SUMMARY OF THE INVENTION

The present invention is directed to a flushing device that satisfies this need.

It is an object of the present invention to provide a flushing device of simple construction that will enable skim cuts to be performed to precise dimensions.

It is a further object of the present invention to provide a flushing device through which, during skim cuts, dielectric fluid can be introduced into the machining gap at a low but constant flow rate, without using expensive flow rate adjustment equipment.

Additional objects, advantages and novel features of the invention will be set forth in the description that follows, and will become apparent to those skilled in the art upon reading this description or practicing the invention. The objects and advantages of the invention may be realized and attained by practicing the invention as recited in the appended claims.

In order to achieve the above objects, there is provided a flushing device according to the present invention having therein a chamber into which dielectric fluid is supplied, for injecting dielectric fluid into a machining gap formed between a workpiece being machined and a wire electrode in a wire-cut electric discharge machine.

A nozzle, movable between a first position and a second position that is nearer the workpiece than the first position is also provided, for directing the dielectric fluid in the chamber toward the machining gap.

A spring or other biasing means is provided for holding the nozzle in the first position.

It is a principle of the present invention that the spring constant of the spring or other bias means is such that during first cuts, when dielectric fluid is supplied to the chamber at a first pressure, the force exerted by the fluid is sufficient to overcome the force of the spring, and the nozzle is caused to move to the second position; and during skim cuts, when the dielectric fluid is supplied to the chamber at a second pressure that is lower than the first pressure, the force exerted by the fluid is insufficient to overcome the force of the spring, and the nozzle remains at the first position.

BRIEF DESCRIPTION OF THE FIGURES

The accompanying drawings, which are incorporated in, and form a part of the specification, illustrate embodiments of the present invention and, together with the description, serve to explain the principles of the invention. In the drawings.

PRESENTLY PREFERRED EMBODIMENT OF THE INVENTION

Figure 1A:
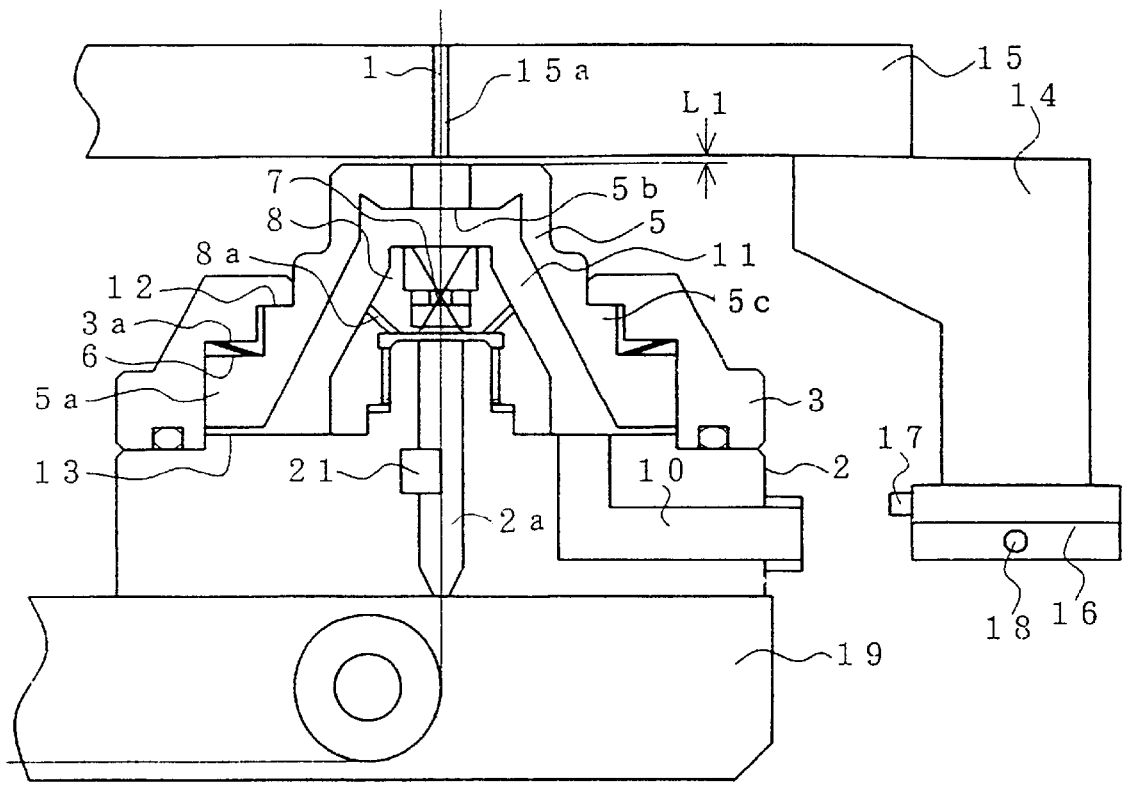
FIGS. 1A and 1B are cross-sectional elevation views of a flushing device according to an embodiment of the present invention.
Figure 1B:
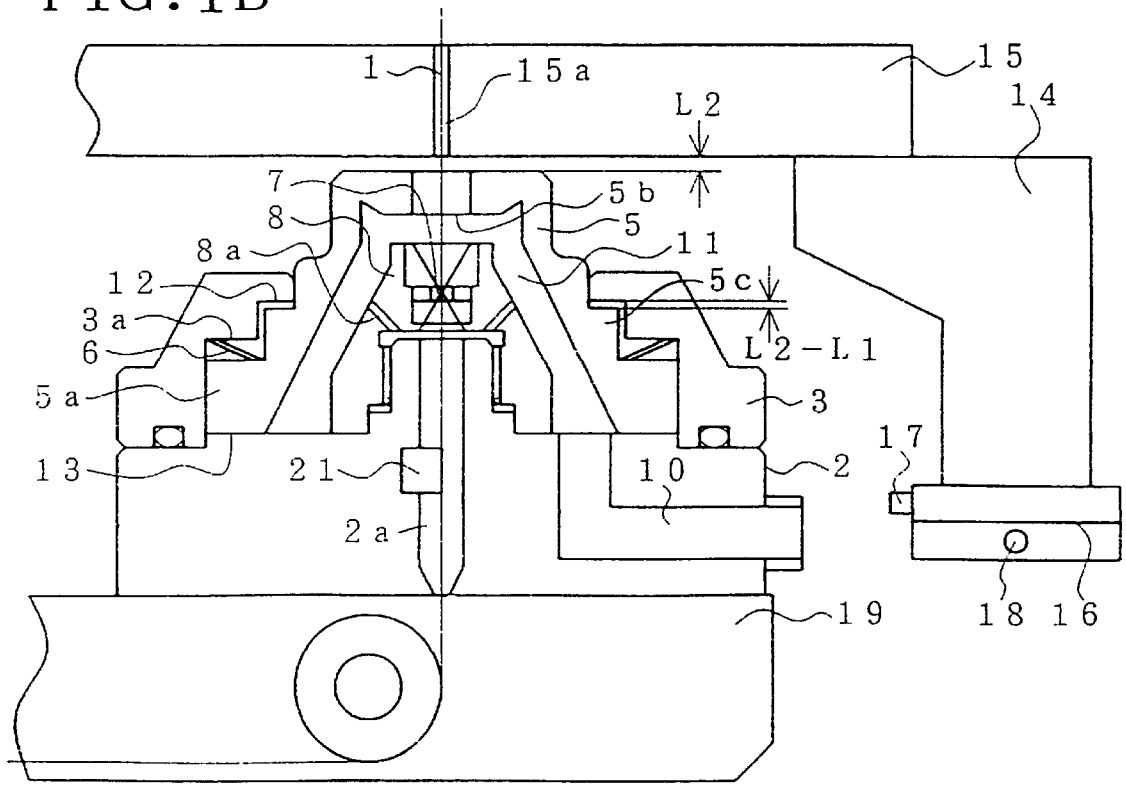

The best mode of a presently preferred embodiment for carrying out the invention is described in detail below, with reference to the attached drawings. FIGS. 1A and 1B both show a lower flushing device of the present invention positioned below a workpiece. A first cut operation is illustrated in FIG. 1A and a skim cut operation in FIG. 1B. Not shown in the drawings is an upper flushing device, which is essentially identical in construction to the lower flushing device shown, differing primarily in that it is positioned above the workpiece instead of below it.

A work stand 14 on which a workpiece 15 is secured is supported on an XY cross-table 16 which is driven by motors 17 and 18. A wire electrode 1 passes through a kerf 15a formed in the workpiece 15. A base 2 of the flushing device has a vertical through-hole 2a through which the wire electrode 1 passes. This base 2 is supported at the end of a horizontally extended lower arm 19. Provided inside the base 2 is a power-feed contact 21 for supplying electric current to the wire electrode 1. The lower arm 19 is supported on, for example, a column (not illustrated). A cylindrical nozzle-holder 3 is affixed to the base 2. A nozzle 5, which is made of a hard, non-conductive material such as polycarbonate, is installed inside the nozzle-holder 3 such that it can be moved up and down in the holder. The nozzle 5 has, at its lower end, a flange 5a, the vertical surface of which slides along the vertical inner surface of the nozzle-holder 3; and at its upper end, an discharge opening 5b. A shoulder 5c is formed in the nozzle 5 to vertically abut a first stopper 12 formed on the inside of the nozzle holder 3. A disk spring 6 is provided, compressed by a prescribed amount, between a step 3a formed on the inside of the nozzle-holder 3, and the top of the flange 5a of the nozzle 5. In the normal state, the spring 6 presses the nozzle 5 downward.

A wire guide 7 has a guide hole through which the wire electrode 1 passes. The wire guide 7 is supported to be co-axial with the nozzle 5, at the top end of a guide holder 8, which is attached to the base 2. The diameter of the guide hole of the wire guide 7 is slightly greater than that of the wire electrode 1. For example, for a wire electrode 1 with a diameter of 0.20 mm, the diameter of the guide hole would be 0.22 mm.

Dielectric fluid supplied from a fluid supply system (not illustrated) passes through a duct 10 formed within the base 2, to a chamber 11 formed between the nozzle 5 and the wire guide 7. Nearly all of this dielectric fluid is supplied through the discharge opening 5b of the nozzle 5 to the machining area of the workpiece 15. A passage 8a, leading to the through-hole 2a in the base 2 is formed in the guide holder 8. Some of the dielectric fluid passes through this passage 8a to cool the power-feed contact 21.

The high pressure of the fluid flowing in the chamber 11 urges the nozzle 5 toward the surface of the workpiece 15, this motion stops when the shoulder 5c of the nozzle 5 comes in contact with a first stopper 12. The nozzle 5 is urged in the opposite direction (away from the surface of the workpiece 15) by the force of the spring 6. This motion stops when the flange portion 5a of the nozzle 5 comes in contact with a second stopper 13. A portion of the top surface of the base 2 serves as the second stopper 13. In other words, the travel of the nozzle 5 toward the workpiece 15 is limited by the first stopper 12, and its travel away from the workpiece 15 is limited by the second stopper 13.

Figure 2A:
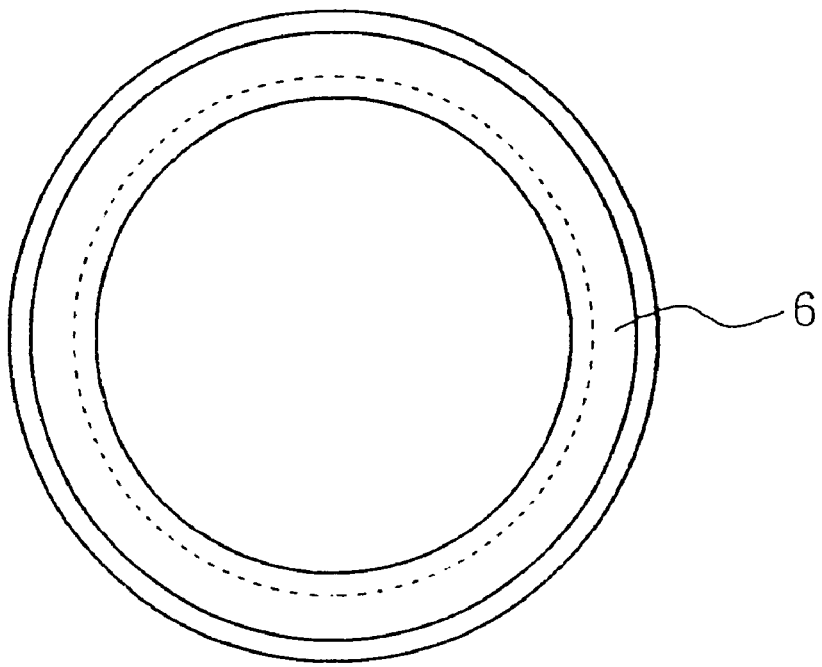
FIG. 2A is a plan view of one example of a spring for the flushing device of the present invention.
Figure 2B:
FIG. 2B is an elevation view of the spring of FIG. 2A.

FIGS. 2A and 2B are plan and elevation views, respectively, of an example of the disk spring 6. The truncated-cone-shaped disk spring 6 may be made, for example, of polycarbonate.

Figure 3A:
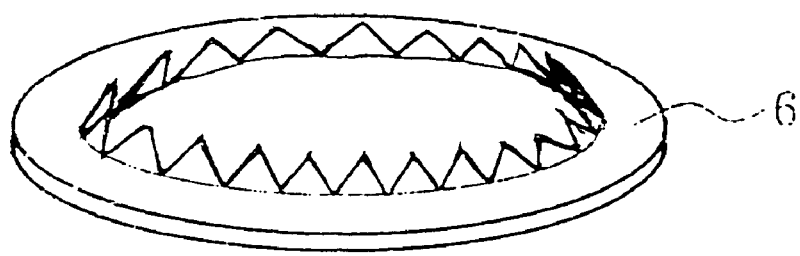
FIG. 3A is an oblique view of another example of a spring for the flushing device of the present invention.
Figure 3B:
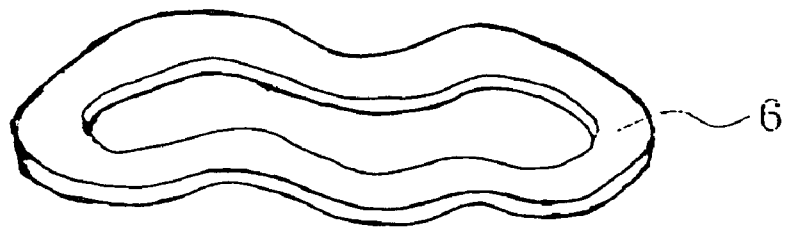
FIG. 3B is an oblique view of still another example of a spring for the flushing device of the present invention.

FIGS. 3A and 3B show alternative examples of disk springs 6.

The relationship between the height of the spring 6 and the maximum length of the gap formed between the step 3a and the flange 5a is determined such that when no dielectric fluid is being supplied to the chamber 11, the spring 6 will be in a prescribed state of compression wherein it presses the flange 5a against the second stopper 13. The spring constant of the spring 6 is selected such that when fluid is supplied into the chamber 11 under a high pressure setting, e.g., approximately 15 kgf/cm$^2$ (first pressure setting), the spring 6 allows the nozzle 5 to move upward; and when fluid is supplied in the chamber 11 under a low pressure setting, e.g., approximately 0.5 kgf/cm$^2$ (second pressure setting), the spring 6 prevents the nozzle 5 from moving. Normally, the first pressure setting would be used for a rough cut, i.e., a first cut; and the second pressure setting for finishing, i.e., skim cuts. Thus, during skim cuts, the reactive force of the spring 6 (its spring constant multiplied by the length of compression deformation) overcomes the pressure of the dielectric fluid in the chamber 11, and presses the nozzle 5 against the second stopper 13.

Figure 4:
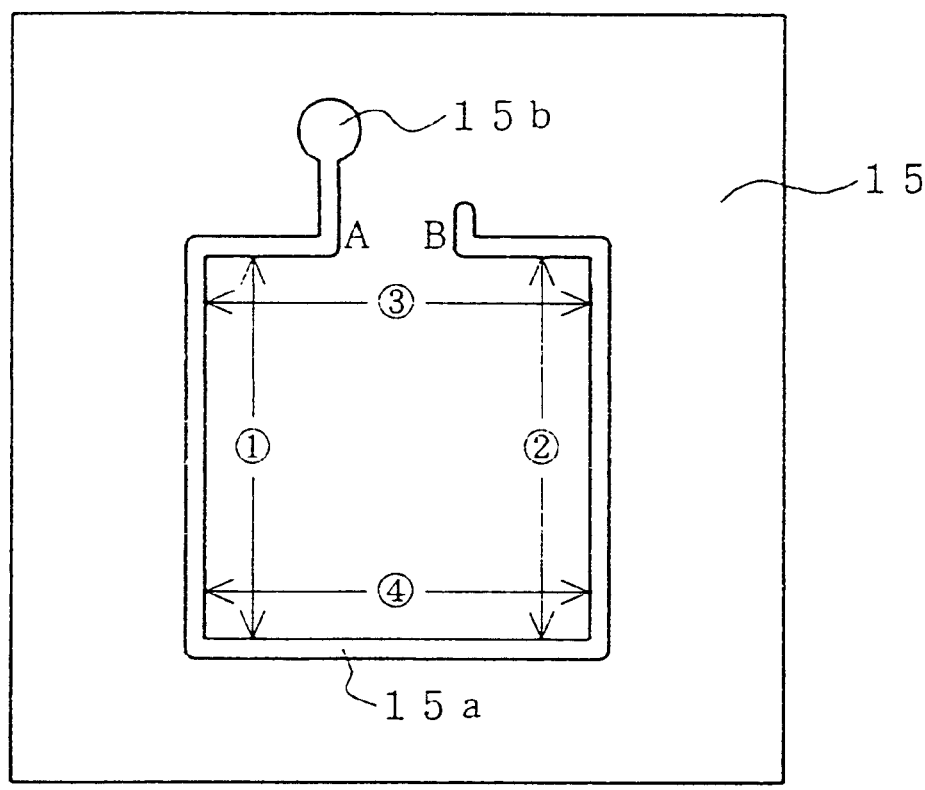
FIG. 4 is a plan view illustrating a workpiece from which a square punch is being formed.

In preparation for electric discharge machining, the work stand 14 is driven in the X- and Y-axis directions by the motors 17 and 18 to position the workpiece 15 so that the start hole 15b in FIG. 4 is aligned with the discharge opening 5b of the nozzle 5. The wire 1 is fed from a wire supply reel (not illustrated), and passes through the upper flushing device and the start hole 15b, to arrive at the lower flushing device. The wire 1 then continues on, passing through the discharge opening 5b of the nozzle 5, the wire guide 7, and the through-hole 2a of the base 2, after which it is sent by a wire take-up device to an appropriate wire collection device.

During machining, the wire electrode 1 travels along a given wire transport path at a prescribed tension and rate of travel. Deionized pure water, or pure water with additives such as particulate matter or a surfactant, passes through the duct 10 to be supplied to the chamber 11. The dielectric fluid fills the chamber and proceeds to the discharge opening 5b, where it is expelled into the machining gap to envelope the wire electrode.

To perform electric discharge machining in the machining gap, voltage pulses are intermittently applied between the wire electrode 1 and the workpiece 15, as dielectric fluid is constantly supplied to the gap. As material is removed from the workpiece 15 by this electric discharge, the workpiece 15 is moved relative to the wire 1 along a prescribed path within the X-Y plane in accordance with a machining program. In this manner, the workpiece 15 is formed into a desired shape. After this first cut, a skim cut is performed to produce a finished workpiece 15 precisely machined to the desired dimensions.

During the first cut, pressurized dielectric fluid is supplied to the chamber 11 at the first pressure setting, e.g. at approximately 15–20 kgf/cm². At this first pressure setting, the fluid pressure overcomes the force exerted by the spring 6 and pushes the nozzle 5 upward to where it protrudes out of the top of the nozzle holder 3 as shown in FIG. 1A.

During the skim cut, the second fluid pressure setting used, e.g. of approximately 0.5–1.0 kgf/cm², does not apply enough fluid pressure to overcome the force of the spring 6, and the nozzle 5 continues to be held fast against the base 2 by the spring 6, as shown in FIG. 1B. Thus the tip of the nozzle shifts between two positions in accordance with the dielectric fluid pressure setting. For a rough cut, i.e., a first cut, a gap of length L1 is established between the surface of the tip of the nozzle 5 and the bottom surface of the workpiece 15. Because this gap of length L1 is small (on the order of 0.05 mm) there is very little wasted dielectric fluid, with almost all of the fluid being injected directly into the machining gap and the kerf 15a. This high-volume flush provides efficient removal of chips from the machining gap and enhanced cooling of the wire 1 and the workpiece 15, which results in higher machining rates. During finishing, i.e., skim cuts, the size of the gap between the tip of the nozzle 5 and the bottom of the workpiece 15 is length L2 which is larger than L1. This larger gap allows some of the dielectric fluid from the discharge opening 5b to escape through the larger L2-size gap, to spray outward along the bottom of the workpiece 15. As a result, in spite of variations in the flow rate of the fluid from the discharge opening 5b, the flow rate of the fluid going into the machining gap is maintained at a constant value, and the machining of the workpiece 15 is precise. The preferred values for L1 and L2 are obtained by effecting proper design in terms of the height of the top surface of the base 2 and the stroke of the nozzle 5 between the first stopper 12 and second stopper 13 (L2-L1). Because the preferred value for the stroke (L2-L1) is normally a small value (about 1 mm or less), a dish spring with a small amount of deformation can be used, and the flushing device can be made small.

An experiment was performed in which the punch of FIG. 4 was machined under different conditions in four separate examples:

EXAMPLE 1

Two flushing devices according to the present invention, one placed above and one below the workpiece 15, were used to perform wire-cut electric discharge machining of the workpiece 15 with conditions as listed in Table 1. During machining, the workpiece 15 was fully immersed in dielectric fluid in a work tank.

TABLE 1

| | |
|---|---|
| Wire electrode 1 | brass, 0.2 mm in diameter |
| Workpiece 15 | SKD-11 (JIS std) plate*, 40 mm thick |
| Item being made | 10 mm square punch |
| Nozzle 5 tip outside diameter | 14 mm |
| Nozzle 5 discharge opening 5b diameter | 6 mm |

*Equivalent to AISI std D2 steel

During the first cut, dielectric fluid was supplied into the chamber 11 at a pressure of 18 kgf/cm², and a flow rate of 6.0 liters/min., with L1=0.05 mm (where L1 is the first length of the gap between the tip of the nozzle 5 and the workpiece 15). Following the first cut, three skim cuts were performed at a fluid pressure of 1 kgf/cm², a flow rate of 1.0 liter/min., and L2=0.4 mm (where L2 is the second length of the gap between the tip of the nozzle 5 and the workpiece 15).

It is preferable that the value for L2 be larger than the width of the kerf 15a. For example, for a wire electrode 1 with a diameter of 0.20 mm, the width of the kerf 15a created by a first cut would be about 0.26 mm. As shown in FIG. 4, the machining was performed so as to leave the portion of the path between A and B uncut, to prevent the punch from falling away from the workpiece. A digital micrometer was used to measure the dimensions (1), (2), (3), and (4), as indicated in FIG. 4, at the top surface, mid-portion, and bottom surface of the punch. The results of these measurements (in millimeters) are listed in the following table.

TABLE 2

| | Top | Middle | Bottom |
|---|---|---|---|
| (1) | 10.002 | 10.004 | 10.004 |
| (2) | 10.002 | 10.005 | 10.004 |
| (3) | 10.003 | 10.005 | 10.003 |
| (4) | 10.003 | 10.004 | 10.004 |

EXAMPLE 2

Next, a machining operation was performed in which the conditions were the same as in the first working example except that the nozzle 5 used was not movable. The first cut and three skim cuts were all performed with the gap between the tip of the nozzle 5 and the workpiece 15 maintained at 0.5 mm. The measurements of the punch made in this operation are listed in Table 3.

TABLE 3

| | Top | Middle | Bottom |
|---|---|---|---|
| (1) | 10.003 | 10.004 | 10.004 |
| (2) | 10.005 | 10.009 | 10.007 |
| (3) | 10.007 | 10.012 | 10.008 |
| (4) | 10.003 | 10.005 | 10.005 |

EXAMPLE 3

For Example 3, the conditions were the same as in Example 2 except for the flow rate of fluid supplied to the chamber 11 during the skim cuts. The flow rate during the skim cuts was kept below 0.5 liters/minute by the operator, who manually fine-tuned the flow rate while visually observing the fluid being ejected from the discharge opening 5b of the nozzle 5. The measurements of the punch machined by this process are listed in Table 4.

TABLE 4

| | Top | Middle | Bottom |
|---|---|---|---|
| (1) | 10.002 | 10.003 | 10.004 |
| (2) | 10.002 | 10.003 | 10.003 |
| (3) | 10.002 | 10.003 | 10.003 |
| (4) | 10.001 | 10.003 | 10.003 |

Based on these experiments, it is possible to draw the following conclusions:

As shown by the data obtained in Example 3 (Table 4), a product having excellent dimensional precision can be obtained when the machine operator fine-tunes the fluid flow rate to a preferred value. However, shown by the data in Table 2, when the flushing device of the present invention is used, precision nearly as good as that of Example 3 can be obtained with no operator intervention. Also, as shown by the data in Table 3, keeping the gap between the nozzle 5 and the workpiece 15 the same during the first cut and skim cuts produces large variances in product dimensions. This is especially conspicuous in the mid-portion measurements, where there is as much as 8 μm of variance between dimensions. Also, in Example 2, a large number of deep vertical machining marks were evident in the machined surface within a range of approximately 3 mm on both sides of each of the four corners. Very few of these machining marks could be seen in Examples 1 and 3.

The foregoing description of preferred embodiments of the invention have been presented for purposes of illustration and description. They are not intended to be exhaustive or to limit the invention to the precise forms disclosed, and obviously many modifications and By variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A flushing device having therein a chamber into which dielectric fluid is supplied for injecting dielectric fluid into a machining sap formed between a workpiece being machined and a wire electrode in a wire-cut electric discharge machine, said device comprising:

a nozzle for directing the dielectric fluid in the chamber toward the machining gap, the nozzle being movable between a first position and a second position, the second position being closer to the workpiece than the first position;

a spring for biasing the nozzle towards the first position, the spring having a spring constant wherein during a first cut, when dielectric fluid is supplied to the chamber at a first pressure, a force sufficient to overcome the force of the spring is created and the nozzle is caused to move to the second position; and wherein during a skim cut, when dielectric fluid is supplied to the chamber at a second pressure which is lower than the first pressure, the force created is insufficient to overcome the force of the spring, and the nozzle remains at the first position; and wherein said spring is a disk spring.

2. The flushing device according to claim 1, further comprises a stopper, and wherein a shoulder is formed in the nozzle to abut the stopper when the nozzle is in the second position.

3. The flushing device according to claim 1, wherein said nozzle has a face opposing the workpiece and wherein as said workpiece is machined, a kerf is formed therein; said nozzle when in the first position, being spaced from the face of said workpiece by a distance at least equal to the size of said kerf.

4. The flushing device according to claim 1 wherein said disk spring has an axis and is formed with undulations in the direction of said axis.

5. The flushing device according to claim 1, wherein said spring is a truncated cone shaped disc spring.

6. The flushing device according to claim 1, wherein said disk spring has a radically inner ring and a radically outer ring and further includes a series of cante levered leaf spring members on said inner ring.

7. The flushing device according to claim 6 where in said leaf spring members form a saw tooth configuration along said inner ring.

8. A flushing device having therein a chamber into which dielectric fluid is supplied for injecting dielectric fluid into a machining gap formed between a workpiece being machined and a wire electrode in a wire-cut electric discharge machine, said device comprising:

a nozzle for directing the dielectric fluid in the chamber toward the machining gap, said nozzle being movable between a first position and a second position, said second position being closer to the workpiece than the first position;

a bias means for biasing the nozzle towards the first position, said bias means having a spring constant wherein during a first cut, when dielectric fluid is supplied to the chamber at a first pressure, a force sufficient to overcome the bias of the bias means is created, and the nozzle is caused to move to the second position; and wherein during a skim cut, when dielectric fluid is supplied to the chamber at a second pressure which is lower than the first pressure, the force created is insufficient to overcome the bias of the bias means, and the nozzle remains at the first position; and wherein said bias means is disk shaped.

9. The flushing device according to claim 8, wherein said nozzle has a face opposing the workpiece and wherein as said workpiece is machined, a kerf is formed therein; said nozzle when in the first position, being spaced from the face of said workpiece by a distance at least equal to the size of said kerf.

10. The flushing device according to claim 8, wherein said flushing device and said nozzle have a cooperating stopper and an opposing shoulder, whereby when the nozzle is in the second position the shoulder abuts the stopper.

11. The flushing device according to claim 10 wherein the shoulder is formed in said nozzle.

12. The flushing device according to claim 11 further comprising a holding device for holding said nozzle on said flushing device, said holding device including said stopper.

* * * * *